April 23, 1963  B. BLITZER  3,086,629
STRUCTURAL PANELS AND ELEMENTS THEREOF
Filed July 8, 1959  4 Sheets-Sheet 1
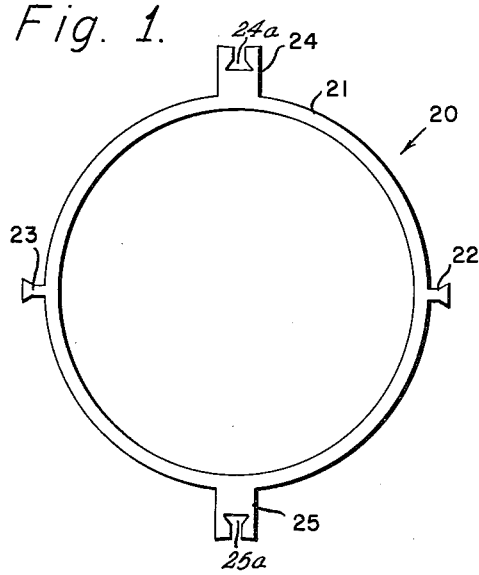
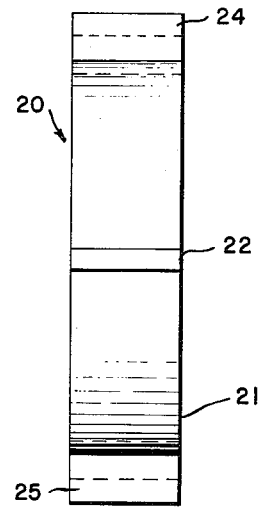
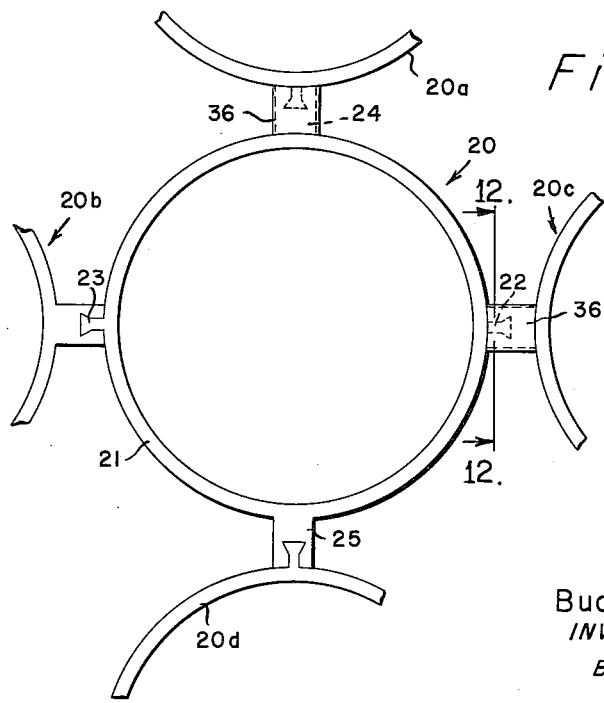
Bud Blitzer,
INVENTOR
BY.
ATTORNEY.

April 23, 1963 B. BLITZER 3,086,629
STRUCTURAL PANELS AND ELEMENTS THEREOF
Filed July 8, 1959 4 Sheets-Sheet 2
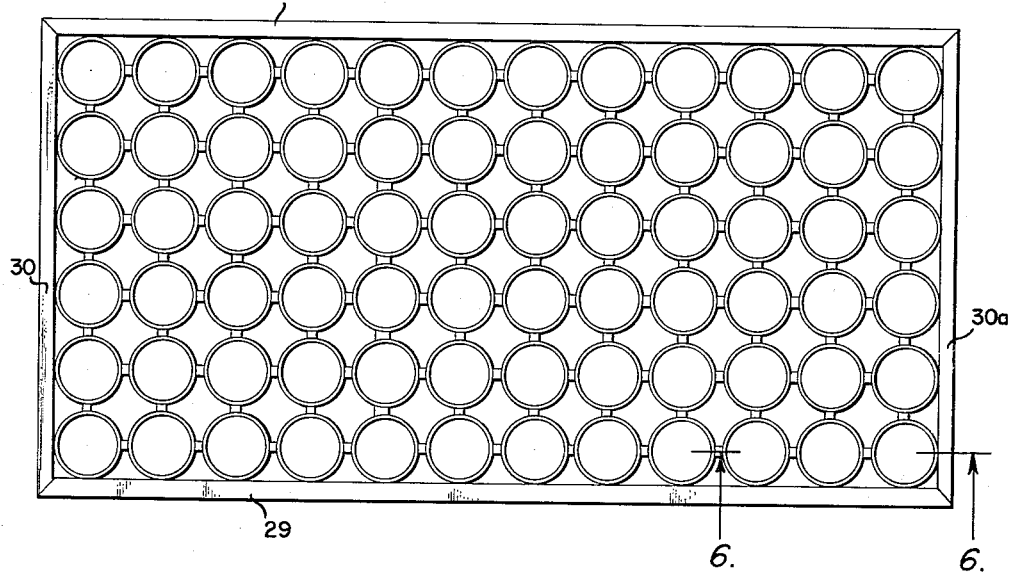
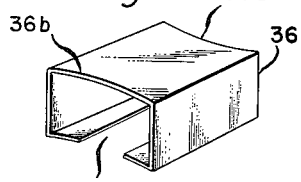
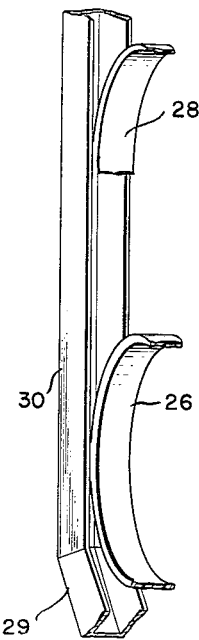
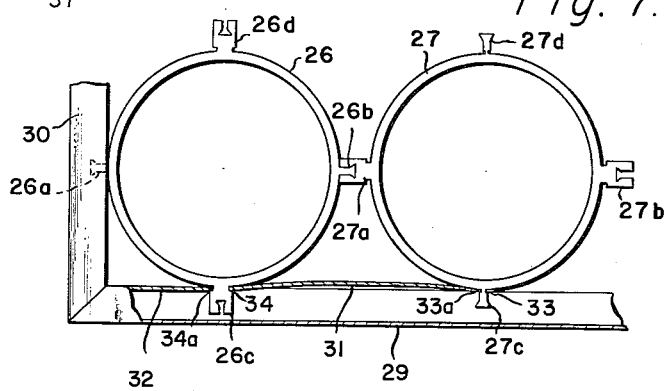
Bud Blitzer,
INVENTOR
BY
ATTORNEY.

Bud Blitzer,
INVENTOR.

BY.

ATTORNEY.

April 23, 1963    B. BLITZER    3,086,629
STRUCTURAL PANELS AND ELEMENTS THEREOF
Filed July 8, 1959    4 Sheets-Sheet 4

Bud Blitzer,
INVENTOR.
BY.

ATTORNEY.

United States Patent Office 3,086,629
Patented Apr. 23, 1963

3,086,629
STRUCTURAL PANELS AND ELEMENTS THEREOF
Bud Blitzer, 3625 Berryman Ave., Los Angeles 66, Calif.
Filed July 8, 1959, Ser. No. 825,808
7 Claims. (Cl. 189—82)

The present invention relates to structural panels and to elements of which such panels are formed as well as for the method of manufacture of such elements and assembly thereof.

It relates more particularly to structures formed with interlocking members said structures being so designed that each is similar or identical to the other and is capable of interlocking engagement with other similar elements to permit the assembly of structures or panels of predetermined dimensions.

Structures of the type described are suitable for use as ornamental panels, grills, sun screens, window shading and protecting members, partitions, room dividers, wall structures, railings and the like and can be readily assembled or disassembled as desired.

The present invention consists of individual tubular elements provided with a plurality of circumferentially spaced outwardly projecting members formed to provide interlocking means adapted to engage corresponding means in other tubular structures of the same or different configuration, or permit assembly to form a structure of the desired size and shape. Preferably each element consists of both male and female interlocking members adapted to engage with mating members attached to identical or similar elements. These may be assembled and locked together to prevent slippage or loosening and if desired may be positioned within a suitable framework which engages edge members of said elements to provide a unitary panel construction. The term "tubular" as used herein is intended to include both curvilinear or polygonal hollow elements having a continuous configuration including those having circular elliptical, triangle, rectangular, pentagonal, hexagonal or other desired cross sections.

It is an object of the present invention to provide a structural panel member formed with a plurality of interlocking elements.

It is a further object of the present invention to provide a structural member composed of a plurality of tubular segments which may be readily assembled from individual elements in any desired size and shape and which may also be readily disassembled when desired.

It is an additional object of the present invention to provide a novel structural element adapted to be interlocked with other elements of the same or similar structure to form composite and unitary panels of a desired configuration.

It is a still further object of the invention to provide a simple and effective method for the manufacture of elements or segments of which the structural panel member may be formed as well as for the assembly and interlocking thereof.

Other objects will be apparent from a consideration of the specification and drawings which are further refered to below.

In the drawings:

FIGURE 1 is an end view in elevation of one of the structural elements of the invention.

FIG. 2 is a side view in elevation of the structural element of FIG. 1.

FIG. 3 is a front view in elevation illustrating the assembly of a plurality of elements such as those illustrated in FIG. 1 and 2.

FIG. 4 is a front elevational view illustrating a panel assembled from a number of structural elements shown in FIGS. 1 and 2 and provided with edge mounting means therefor.

FIG. 5 is an enlarged view in elevation of a portion of the edge area of FIG. 4.

FIG. 7 is an enlarged view partly in elevation and partly in longitudinal cross section of a portion of the panel shown in FIG. 4.

FIG. 8 is a view in perspective showing a joint masking and clamping element.

Figure 9:
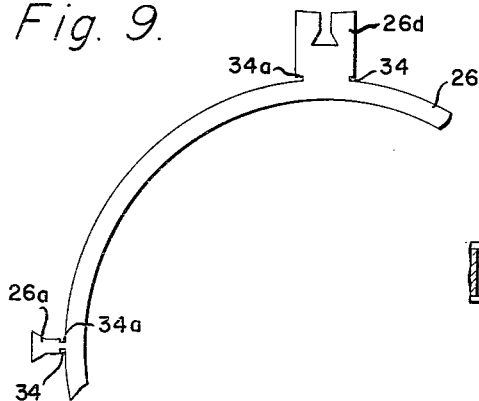
FIG. 9 is a view in elevation illustrating a modified form of interlocking member adapted to receive edge framing strips.
Figure 6:
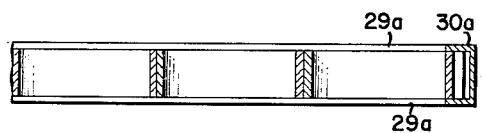
FIG. 6 is a transverse cross sectional view through the frame area of FIG. 4 taken along lines 6—6.

As shown in the drawings, the structural element of which this invention is composed is illustrated in FIGS. 1 and 2. Tubular member 20 is in the form of a ring 21 of a predetermined diameter, thickness and width. Any suitable dimensions may be utilized, however, preferred dimensions are from $\frac{1}{16}$ to $\frac{1}{4}$ inch in thickness, $\frac{1}{2}$ to 4 inches in width and 4 to 12 inches in diameter. The ring is preferably formed of metal, such as extruded aluminum, and is provided with a plurality of spaced interlocking elements shown as male members 22 and 23 and female members 24 and 25 having slots 24a and 25a. Preferably these are uniformly spaced alternately around the periphery of the ring and four of these elements, two male and two female, spaced 90 degrees apart, have been found to be suitable for the purpose. It will be seen that one of these rings can interlock with four identical members by joining the male and female elements with corresponding mating elements on corresponding rings to be affixed thereto. The interlocking elements are preferably formed to project outwardly from the circumference of the ring so that when a plurality of these are interlocked as shown in FIG. 3 they will be spaced from each other by the length of the two interlocking portions when so assembled. The interlocking members project outwardly radially of the tubular member, and as shown are preferably spaced 90 degrees apart although other spacing may be provided if desired.

As shown in FIG. 4 a desired number of these rings is assembled to form a grill or similar structure of desired shape. The shape of the panel illustrated in FIG. 4 is rectangular and the edges of the panel are formed by a channel member into which the exposed and interlocking elements project so that they engage and are enclosed by said channel. This relationship is illustrated in greater detail in FIGS. 5 and 6 and 7. As shown in FIGS. 4, 5 and 6 and 7, a plurality of rings including those shown at 26, 27, 28 and others as shown are enclosed within edge channels 29 and 29a and 30 and 30a to define a rectangular panel assembly. As illustrated in greater detail in FIG. 7 for example, the respective ring members are positioned so that their outwardly projecting interlocking members enter into and are engaged within the channel. For example as shown in FIG. 7, interlocking members 26c and 27c are positioned within channel 29 and interlocking member 26a is positioned within channel 30. Corresponding elements of other rings adjacent the edge of the panel are similarly positioned. The other interlocking elements such as 26b, 26d, interlock with corresponding mating elements of adjacent rings, as for example in the case of element 26b which interlocks with the mating element 27a of ring 27 while the other interlocking members 27b and 27d are designed to be interlocked with additional rings, and so on. This arrangement is also shown in enlarged detail in FIG. 5 in which the edge relationship of the rings is shown. Similarly the position of the interlocking elements with respect to the channels is illustrated in cross section in FIG. 6. In addition, in order to enclose the open spaces of the channel not occupied by the interlocking elements of the rings and also to present a uniform and pleasing appearance, closure strips may be provided in the form of flat strip members 31 and 32 which are designed to engage the upper edges of the channel by being pressed therein between rings and between the corner ring and the corner of the frame as shown at 31 and 32. Means may be provided for retaining these strips which may be grooves or corrugations formed at the upper side edges of the channel, or, if desired, may be slots formed in the interlocking members adjacent the point where they project from the ring as for example slots 33 and 33a and 34 and 34a formed transversely of the interlocking member at the points indicated in FIG. 7 and shown in greater detail in FIG. 9. The dimensions of these slots are such that the ends of strips 31 and 32 will be engaged thereby, the length of the strip being selected to be slightly greater than the space between the interlocking members so that a small degree of spring pressure will be exerted to retain them in engagement with the ring and between the side walls of the channel.

Figure 11:
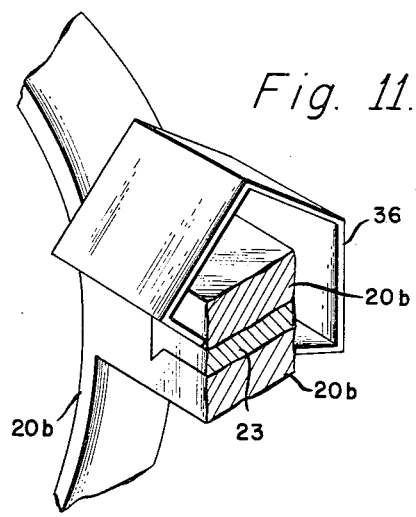
FIG. 11 is an isometric view, partly in section, of the manner of installing a spring clip on an interlocking joint.
Figure 12:
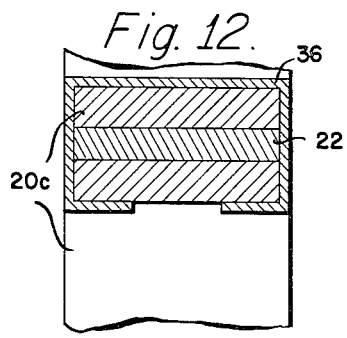
FIG. 12 is a transverse cross sectional view taken along lines 12—12 of FIG. 3, showing the assembly of FIG. 11 in place.

It is frequently desirable to ensure interlocking engagement of the rings by providing means to prevent forward lateral slippage of the joint and this may be taken care of in the manner illustrated in FIGS. 8, 11 and 12. As shown, a spring clip 36 is provided, having dimensions such that it will slip over and engage a pair of interlocking elements. The clip is formed by bending from a strip of spring metal and is bent to form a rectangular sleeve with an opening 37 so that it may be forced apart when it is slipped over the joint in the manner shown in FIG. 11. If desired, the front face of the clip may be contoured as at 36a and 36b so that the front edges will conform to the curvature of the rings. As shown in FIG. 11, the clip 36 is forced over the interlocked portions and then firmly engages the joint as shown in FIG. 12. In this position tongue 22 engages the groove of ring 20c.

Figure 10:
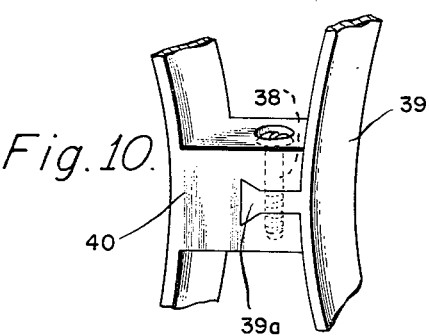
FIG. 10 is a view in elevation illustrating another manner of securing the interlocking portions of the elements of the invention together.
Figure 19:
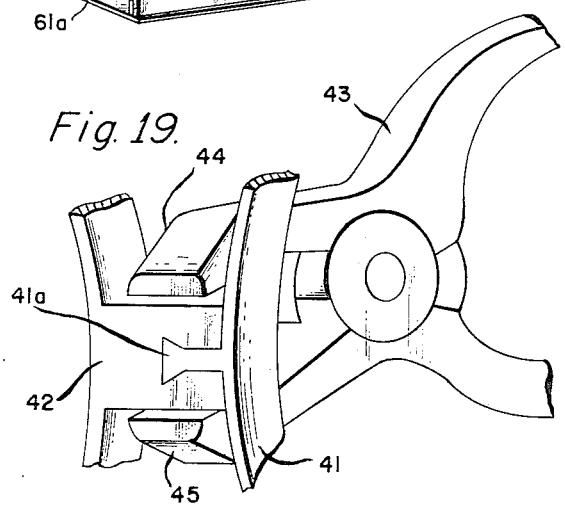
FIG. 19 is a view in perspective illustrating one manner of interlocking the tubular segments.

An alternative manner of locking the interlocking elements is illustrated in FIG. 10 in which segments 39 and 40 are locked together by means of a screw 38, which passes through tongue 39a into a threaded opening in 40. Other locking means such as rivets or the like may be provided in a similar manner. Alternatively, after the tongue and groove members are in place, they may be locked together by squeezing or otherwise compressing the outer sides of the grooved member between which the tongue is engaged, to force the inner walls of the groove against the tongue to lock it in place by compression. This is illustrated in FIG. 19, in which segments 41 and 42 are interlocked by compressing tongue 41a within the grooved portion of 42 by means of tool 43 through pressure exerted against jaws 44 and 45.

Figure 13:
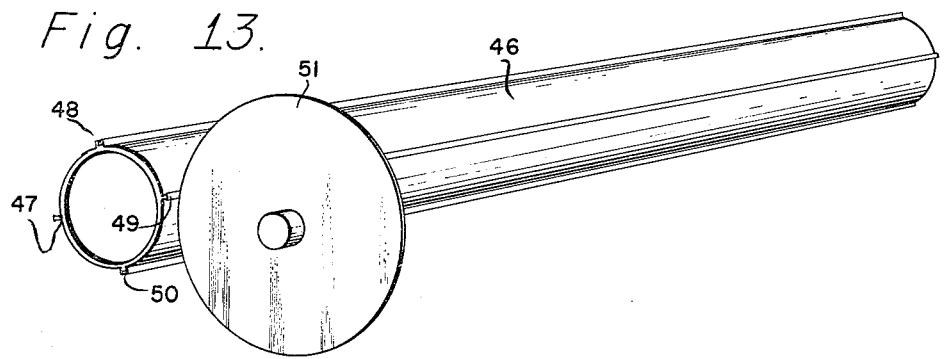
FIG. 13 is a view in perspective illustrating the manner in which segments are cut from an elongated member.

The method by which the individual tubular segments are made is illustrated in part by FIG. 13. The cross sectional shape of the segment is selected so that it may be extruded in elongated form through a die. This is particularly true in the case of aluminum which may be readily extruded, so that an elongated tubular member is extruded with integrally formed extensions adapted to interlock with corresponding mating extensions in similar members, as shown at 47, 48, 49 and 50. By means of a rotary cutting tool 51, such as an abrasive disc, individual segments corresponding to the width desired may be sliced off. Instead of extruding, the metal may be cast or molded in the desired elongated configuration. Plastic materials may also be used, in which case the desired individual tubular segments may be cast or molded, or else an elongated tubular member may be formed by molding or extrusion, and then sliced into individual elements of the desired width. Suitable plastics are polystyrene, polyethylene, phenol-aldehyde resins and the like.

Figure 14:
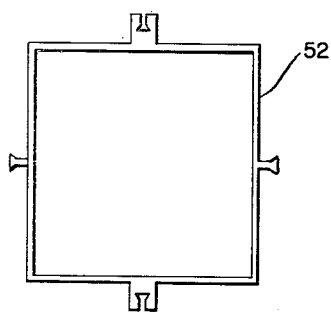
FIGS. 14, 15 and 16 are end elevational views showing alternative configurations of segments.
Figure 15:
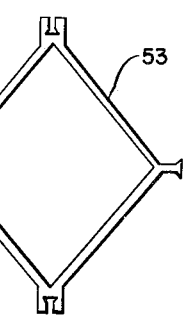
Figure 16:
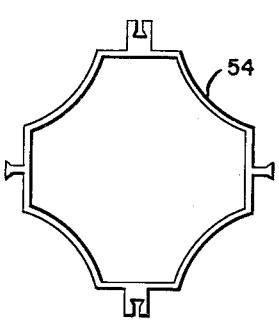

Instead of the circular shape described in FIGS. 1 to 13, other shapes may be formed and united in a similar manner. Such shapes are shown in FIGS. 14, 15 and 16, by way of example. Rectangular member 52 is shown in FIG. 14. Diamond shaped member 53 is shown in FIG. 15. A composite curved and angular configuration is shown at 54 in FIG. 16. Each of these is provided with suitable interlocking elements projecting outwardly therefrom.

Figure 18:
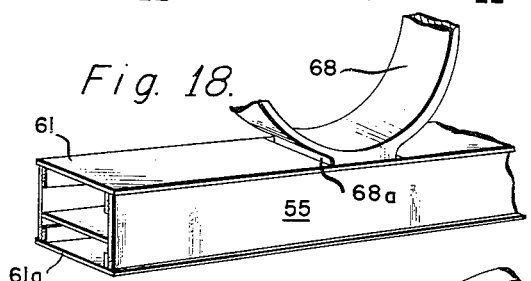
FIG. 18 is a view in elevation and partly in cross section illustrating the channel member of FIG. 17 as assembled.
Figure 17:
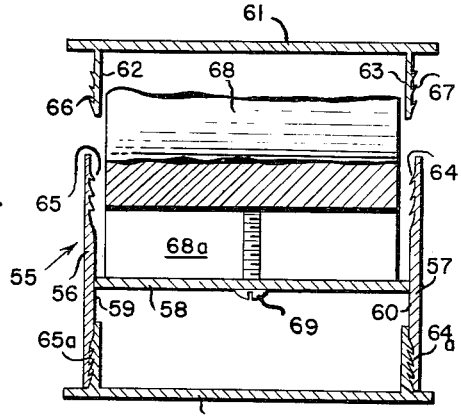
FIG. 17 is a view in transverse vertical cross section of a modified edge channel member and cap therefor.

A modified form of edge construction is illustrated in FIGS. 17 and 18. The edge member consists of an H section channel 55 with legs 56, 57, cross piece 58 and legs 59 and 60. The open face of the channel between the projections on the circular elements positioned therein is closed by means of cap strips 61 formed with downwardly depending legs 62 and 63. The leg members on the H channel are formed with serrations or projections 64, 65, 64a and 65a. These project inwardly, preferably toward the cross member so that they will engage and lock corresponding outwardly projecting serrations 66 and 67 on the cap leg members. A corresponding cap 61a is provided to cover and conceal the opposite opening in the channel. As shown in FIG. 18, the ring members are positioned in the channel with their downwardly extending interlocking elements extending transversely in the channel. Cap strips 61 are positioned between the interlocking elements to enclose the channel and retain the rings in position. The same type of serrations and cap strip may be used in connection with the U-shaped channel member shown in FIGS. 5 and 7. Member 68a is positively locked in position against cross member 58 by means of a bolt or the like 69 as shown in FIG. 17.

An alternative and preferred method of locking the rings together after their interlocking elements are engaged is by compressing the groove portion against the tongue member as shown in FIG. 19. This is done by applying pressure between the jaws of a suitable tool as described above.

The inventor claims:

1. A vertical wall-like structure comprising a plurality of tubular members having substantially horizontal axes, each tubular member having tongue elements directly opposite each other and groove elements directly opposite each other, said tongue elements and groove elements alternating with each other and spaced about the perimeter of said tubular member, the tongue elements of each member being disposed within the groove elements of adjacent members and interlocking therewith with said members in vertical alignment, said members being rigid and having a horizontal length such that said structure is form sustaining and resists lateral deflection.

2. A vertical wall-like structure comprising a plurality of tubular members having substantially horizontal axes, each tubular member having tongue elements directly opposite each other and groove elements directly opposite each other, said tongue elements and groove elements alternating with each other and spaced 90 degrees from each other about the perimeter of said tubular member, the tongue elements of each member being disposed within the groove elements of adjacent members and interlocking therewith with said members in vertical alignment, said members being rigid and having a horizontal length such that said structure is form sustaining and resists lateral deflection.

3. A vertical wall-like structure comprising a plurality of tubular members having substantially horizontal axes and arranged in horizontal rows disposed one above the other, each tubular member having tongue elements directly opposite each other and groove elements directly opposite each other, said tongue elements and groove elements alternating with each other and spaced about the perimeter of said tubular member, the tongue elements and groove elements of each member fitting within companion groove elements and tongue elements of tubular members above, below, and on opposite sides thereof and interlocking therewith, said members being rigid and having a horizontal length such that said structure is form sustaining and resists lateral deflection.

4. A vertical wall-like structure comprising a plurality of tubular members having substantially horizontal axes and arranged in horizontal rows disposed one above the other, each tubular member having tongue elements directly opposite each other and groove elements directly opposite each other, said tongue elements and groove elements alternating with each other and spaced 90 degrees from each other about the perimeter of said tubular member, the tongue elements and groove elements of each member fitting within companion groove elements and tongue elements of tubular members above, below, and on opposite sides thereof and interlocking therewith, said members being rigid and having a horizontal length such that said structure is form sustaining and resists lateral deflection.

5. A vertical wall-like structure comprising a plurality of tubular members having substantially horizontal axes, each tubular member having tongue elements and groove elements spaced about its perimeter, the tongue elements of each member being disposed within the groove elements of adjacent members and interlocking therewith with said members in vertical alignment, said members being rigid and having a horizontal length such that said structure is form sustaining and resists lateral deflection, a channel receiving the exposed elements of said interlocking tubular members at at least one edge portion thereof to enclose said exposed elements, and means projecting from said channel into at least some of said covered groove elements to fasten said channel to said edge portion.

6. A vertical wall-like structure comprising a plurality of tubular members having substantially horizontal axes, each tubular member having tongue elements directly opposite each other and groove elements directly opposite each other, said tongue elements and groove elements alternating with each other and spaced about the perimeter of said tubular member, the tongue elements of each member being disposed within the groove elements of adjacent members and interlocking therewith with said members in vertical alignment, said members being rigid and having a horizontal length such that said structure is form sustaining and resists lateral deflection, a channel receiving the exposed elements of said interlocking tubular members at at least one edge portion thereof to enclose said exposed elements, and means projecting from said channel into at least some of said covered groove elements to fasten said channel to said edge portion.

7. A vertical wall-like structure comprising a plurality of tubular members having substantially horizontal axes and arranged in horizontal rows disposed one above the other, each tubular member having tongue elements directly opposite each other and groove elements directly opposite each other, said tongue elements and groove elements alternating with each other and spaced 90 degrees from each other about the perimeter of said tubular member, the tongue elements and groove elements of each member fitting within companion groove elements and tongue elements of tubular members above, below, and on opposite sides thereof and interlocking therewith, said members being rigid and having a horizontal length such that said structure is form sustaining and resists lateral deflection, a channel receiving the exposed elements of said interlocking tubular members at at least one edge portion thereof to enclose said exposed elements, and means projecting from said channel into at least some of said covered groove elements to fasten said channel to said edge portion.

References Cited in the file of this patent

UNITED STATES PATENTS

| | | |
|---|---|---|
| 261,282 | Vedder | July 18, 1882 |
| 910,801 | Eggers | Jan. 26, 1909 |
| 1,124,461 | Kohlhepp | Jan. 12, 1915 |
| 1,727,214 | Niccum | Sept. 3, 1929 |
| 2,038,306 | Miller | Apr. 21, 1936 |
| 2,241,952 | Lachman | May 13, 1941 |
| 2,762,117 | Houck | Sept. 11, 1956 |
| 2,762,118 | Shaw et al. | Sept. 11, 1956 |
| 2,801,717 | Schlumbohm | Aug. 6, 1957 |
| 2,854,103 | Kruger | Sept. 30, 1958 |
| 2,900,495 | Zwick | Aug. 18, 1959 |